April 22, 1952 R. C. STRAWN 2,593,933
PLANETARY POWER TRANSMISSION DEVICE
Filed July 3, 1947 7 Sheets-Sheet 1

INVENTOR.
Raymond C. Strawn
BY
Robert H. Wendt
Atty.

April 22, 1952

R. C. STRAWN 2,593,933

PLANETARY POWER TRANSMISSION DEVICE

Filed July 3, 1947

Inventor
Raymond C. Strawn
By Robert H. Wendt
attorney

April 22, 1952 R. C. STRAWN 2,593,933
PLANETARY POWER TRANSMISSION DEVICE
Filed July 3, 1947 7 Sheets-Sheet 5

Inventor
Raymond C. Strawn
By Robert H. Wendt
Attorney

April 22, 1952   R. C. STRAWN   2,593,933
PLANETARY POWER TRANSMISSION DEVICE
Filed July 3, 1947   7 Sheets-Sheet 6

INVENTOR.
Raymond C. Strawn
BY
Robt H. Wendt
Atty.

April 22, 1952     R. C. STRAWN     2,593,933
PLANETARY POWER TRANSMISSION DEVICE
Filed July 3, 1947     7 Sheets-Sheet 7

INVENTOR.
Raymond C. Strawn
BY Robert H. Wendt
Att'y

Patented Apr. 22, 1952

2,593,933

UNITED STATES PATENT OFFICE 2,593,933

PLANETARY POWER TRANSMISSION DEVICE

Raymond C. Strawn, Chicago, Ill.

Application July 3, 1947, Serial No. 758,909

17 Claims. (Cl. 74—8)

1

The present invention relates to planetary power transmission devices, and is particularly concerned with an improved power transmission device of the planetary type, in which the revolution of the planet element is not limited, but may under certain conditions extend over 360 degrees, and in which advantage is taken of this full planetary action to provide a transmission device having improved characteristics and functions not present in any device having a limited range of planetary movement. This device may rotate or oscillate as load requirements demand.

The present application is a continuation in part of my prior application, Ser. No. 502,910, filed September 18, 1943, for True Planet Safety Transmission, now abandoned, and is to be substituted for said prior application.

In order to illustrate one example of the invention, I have selected the combination of the planetary transmission device with an internal combustion engine and a motor starter; but the present device is capable of general application to many different uses, and may be employed for transmission of power in either direction through said device, and its uses are not limited merely to those illustrated.

One of the objects of the invention is the provision of an improved planetary transmission device which is adaptable to the transmission of power in either direction so that the prime mover may be applied to what is normally the output end of the device, the driven member being applied to what is normally the input end.

Another object of the invention is the provision of an improved device of the class described which is adapted to effect a safety release upon overload of the driven member and to open the power transfer mechanism completely whenever such a condition is desirable.

Another object is to provide a coupling of the class described which is adapted to effect a release of the mechanism whenever there is a reverse torque exceeding a predetermined amount, such as a back-fire, which is also adapted to result in a complete opening of the power connection under these conditions.

Another object is to provide a gear coupling which is self-corrective in regard to proper engagement of the gears, which increases the life of the gears, which eliminates the necessity for processing gear teeth on their ends for longitudinal engagement, and which practically eliminates breakage and failure of parts of the mechanism.

A further object of the invention is the provision of an improved coupling of the class described which is adapted to give service for a long period of time without necessity for repair or replacement of its parts, and in which temperature changes or the normal accumulation of foreign matter on the gears or other parts will not impair its operation.

Another object is to provide a shiftable intermediate axis between the prime mover and the driven member to inhibit leverage strains and shocks from transferring to the axis of the prime mover or driven member.

Another object is the elimination of over-run or back transmission of power to the power source and the elimination of the destructive effects caused by them.

Another object of the invention is the provision of an improved power coupling so constructed that strains or shock impressed upon the coupling are eliminated in either direction and so that instead of transmitting such strains or shock to the main axis of the system the planetary element is permitted to revolve about that axis to dissipate the force.

Another object is the provision of a gear coupling which is adapted to be engaged with another gear moving at a high speed, without possibility of damaging any of the gears or associated parts, and to provide a coupling which cannot be damaged by inexperienced or careless operators.

Another object is the provision of a coupling of the class described which may be utilized for driving at different speeds, and which is also susceptible to control by speed responsive elements, manual levers, vacuum control units, magnetic devices, or pressure responsive devices.

Another object is to provide an axis for the planetary element which is coaxial with the main axis, but radially displaced from said main axis in such a way as to intercept shock or strain before the shock or strain can be transmitted to said main axis.

A further object is to provide a power coupling as herein disclosed, wherein shiftable load holding elements control the pitch lines at which the working planet element and the driven member operate.

Another object is to provide a new method of power transmission by using planet elements radially displaced from the main axes of the system, and pivotally connecting the sender and the receiver.

Another object of the invention is the provision of a coupling of the type disclosed wherein it is possible for the sender to transmit its full torque to the receiver, and wherein said receiver may receive all of said torque or may vary the reception of said torque from its total to zero, with predetermining devices controlling and timing the power flow according to their design.

Another object of the invention is to provide a coupling wherein a planet element may pass through the driving position of an associated member or move it and be relocated for future or continued use.

Another object of the invention is to provide a planet element radially displaced from the main axis of the system, which can shift its path as it orbits about the system.

Another object of the invention is to provide a driving element which, when driving its driving surfaces, is engaged only to the member it drives, and which is pivoted about the main axis of its system, which is also yieldingly applied relative to the driven member's axis.

Another object of the invention is the provision of an improved mechanism in which the leverage is independent of the gear ratio, since the leverage depends upon the radial distance of the detent plungers 40, 41 from the axis, and the gear ratio depends upon the relative sizes and number of teeth of the gears.

Other objects and advantages will be apparent from the following description and the accompanying drawings, in which similar characters of reference indicate similar parts throughout the several views.

Referring to the seven sheets of drawings accompanying the specification.

Figure 1:
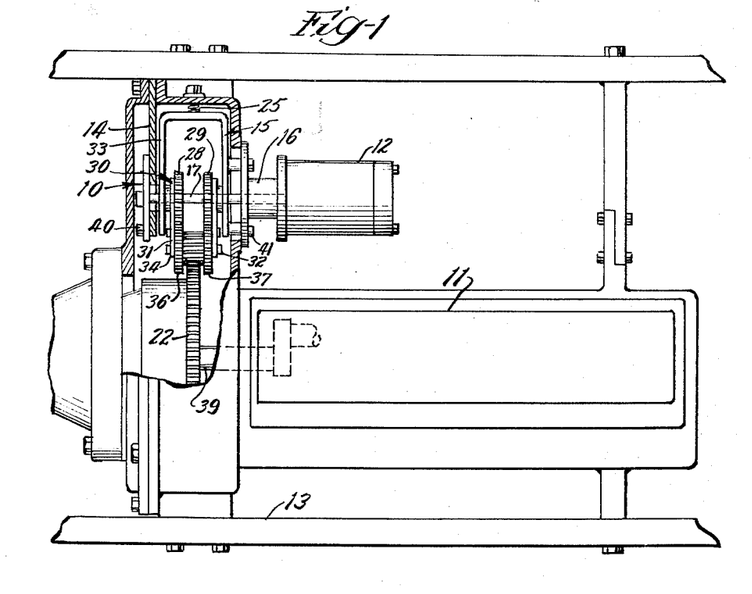
Fig. 1 is a top plan view of an internal combustion engine installation provided with an electric starting motor coupled to the engine flywheel by means of a planetary transmission device embodying my invention.
Figure 2:
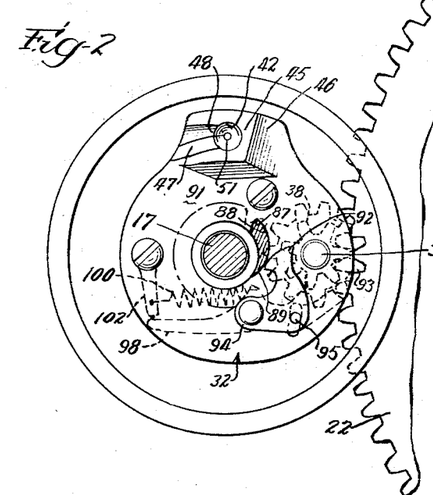
Fig. 2 is a fragmentary sectional view, taken on the plane of the line 2—2 of Fig. 6, on a smaller scale, looking in the direction of the arrows.

Referring to Fig. 1, this shows an example of the application of my planetary power transmission device 10 to an internal combustion motor 11, being powered by means of a motor starter 12.

The internal combustion engine 11 is carried by the chassis 13, which is also provided with a suitable frame member 14 for movably supporting the frame 15 of the planetary transmission device or coupling between the motor starter 12 and the engine 11.

The motor 12 may be carried by a bearing bracket 16, which is fixedly secured to the coupling frame 15, to move with it, as shown in Fig. 1.

The coupling frame 15 is mounted upon the bracket 14 for sliding motion (Fig. 11) by means of a key 19 on each side of the frame 15 slidably mounted in a groove in the bracket 14. This renders it necessary to provide suitable slots in the frame 14 to pass the main shaft 17, such as the slot 20, and other slots are provided for passing other devices which project laterally from the coupling frame 15.

The bracket 14 may be provided with a threaded bore 21 located diametrically oppositely to the flywheel 22, and the bore 21 may contain a threaded plug 23 having a socket 24 for a compression spring 25. The opposite end of the spring 25 seats in a socket 26 in the coupling frame 15 and resiliently urges this frame with its gears toward the flywheel.

In the event that one of the teeth of the flywheel gear 22 should strike head on with one of the teeth of the driving pinion or planetary element, or foreign matter clog the gear recesses, the spring 25 is adapted to give, to permit the entire frame 15 and its associated gears to move away from the flywheel momentarily, until the teeth mesh properly. Then the spring 25 maintains the frame 15 in the proper position for engagement of the driving and driven gears. This feature is not always required; where the driven member does become self-active or excessive foreign matter has access to the gearing, it is preferred.

Figure 16:
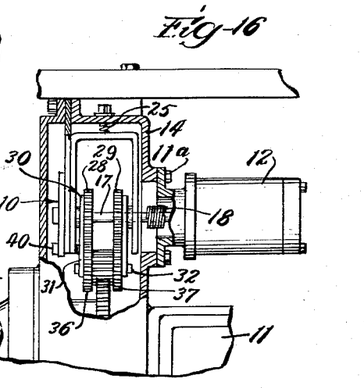
Fig. 16 is a fragmentary sectional illustration similar to Fig. 1 of the type of device in which the motor is fixedly mounted, but the planetary frame support is slidably mounted and the shaft has a universal joint between the transmission and the motor.

In Fig. 16 an alternative form of motor support is shown, in which the motor 12 is fixedly secured to frame 14 by bolts 12a. In this case the motor shaft is connected to shaft 17 by a resilient universal coupling 18, which permits translation of one shaft relative to the other for the purpose just described.

Figure 6:
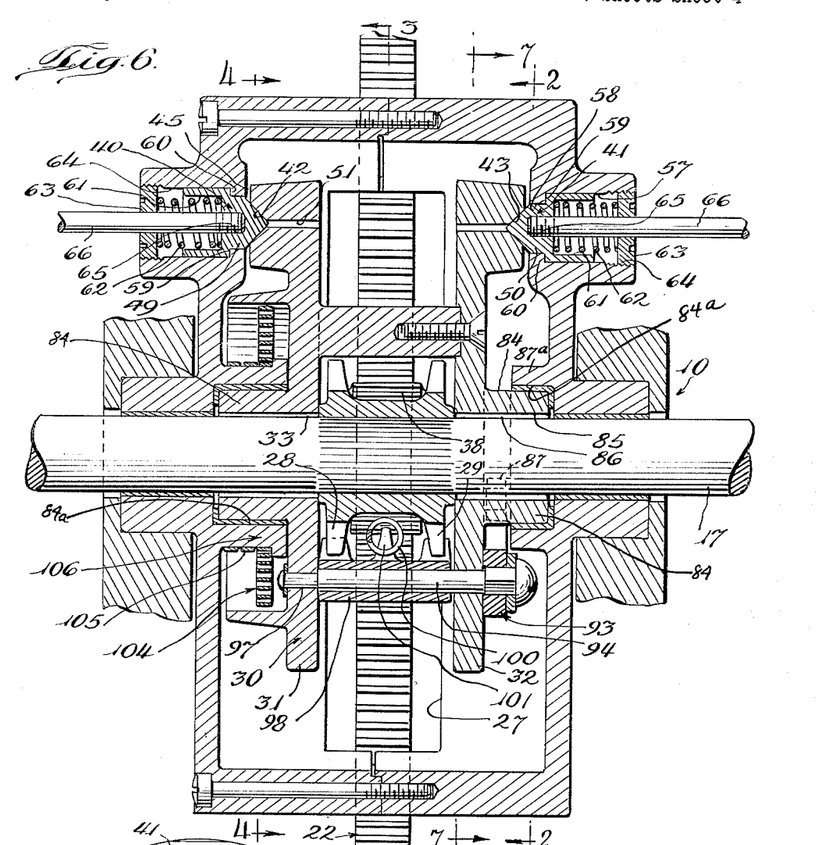
Fig. 6 is a fragmentary sectional view, taken on the plane of the line 6—6 of Fig. 3, looking in the direction of the arrows.

In Fig. 1 the frame 15 of the coupling is shown as an open frame, which is all that is necessary for the support of the parts. For proper continuous lubrication of the gears this frame may be constructed in the form of a housing 15a, as shown in Fig. 6, so that it can contain lubricant, and may be provided with an aperture 27 for engagement with the flywheel, which may also be suitably housed, or lubricated if desired.

Referring again to Fig. 1, the coupling 10 preferably includes a main shaft 17 provided with a pair of gears 28, 29 suitably keyed to the shaft and adapted to be rotated by it. The housing carries a planetary frame 30, which may consist of a pair of side frame members 31 and 32, each of which has a bearing bore 33 for receiving the main shaft 17 so that the planetary frame 30 is mounted for free rotation about the main shaft 17 on bearings carried by the housing.

The side frame members 31 and 32 of the planetary frame 30 are provided with bearing bores 34 for receiving the planetary shaft 35, which is rotatably mounted in said bores for free rotation, and the shaft 35 is also adapted to be revolved in a circular orbit about the main shaft 17, by virtue of its being carried by the planetary frame 30. This frame 30 has its own axis, which is coaxial with the main axis, but is carried on bearing surfaces which are displaced radially from the main shaft.

The planetary shaft 35 supports a pair of gears 36, 37, which mesh with the gears 28 and 29, respectively, and which are fixedly anchored to a planetary pinion or planetary element 38. Thus the gears 36—38 are secured together to rotate together, and the pinion 38 is located so that when the planetary frame 30 is located on a diametric line passing through the axis of shaft 17 and the axis of the crank shaft 39, pinion 38 and flywheel 22 are properly meshed for driving engagement.

Suitable stops are provided, such as the end of the grooves containing the keys 19 (Fig. 11) to limit the motion of the coupling frame 15 toward the flywheel so that the normal biased position of the frame 15 is one in which the pinion 38 and flywheel gear 22 mesh when the axes of the shafts 17, 35 and 39 and rotor axis are in alignment or in the same plane.

As is well known in regard to the characteristics of planetary gears, when the shaft 17 is driven, its power may be transmitted either to the pinion 38, if the planetary frame 30 is held in fixed position, or, if the pinion 38 is held against movement, the power may be transmitted into rotation of the frame 30 about the shaft 17.

Therefore, in order to bring about the transmission of power through the pinion 38 to the flywheel it is necessary to provide the planetary frame 30 with means for holding this frame in the driving position just described. Such a means comprises the plungers shown in Fig. 1 at 40 and 41 and shown in greater detail in Fig. 6, the plungers 40 and 41 cooperating with suitable sockets 42, 43 on the planetary frame 30.

Figures 3, 4:
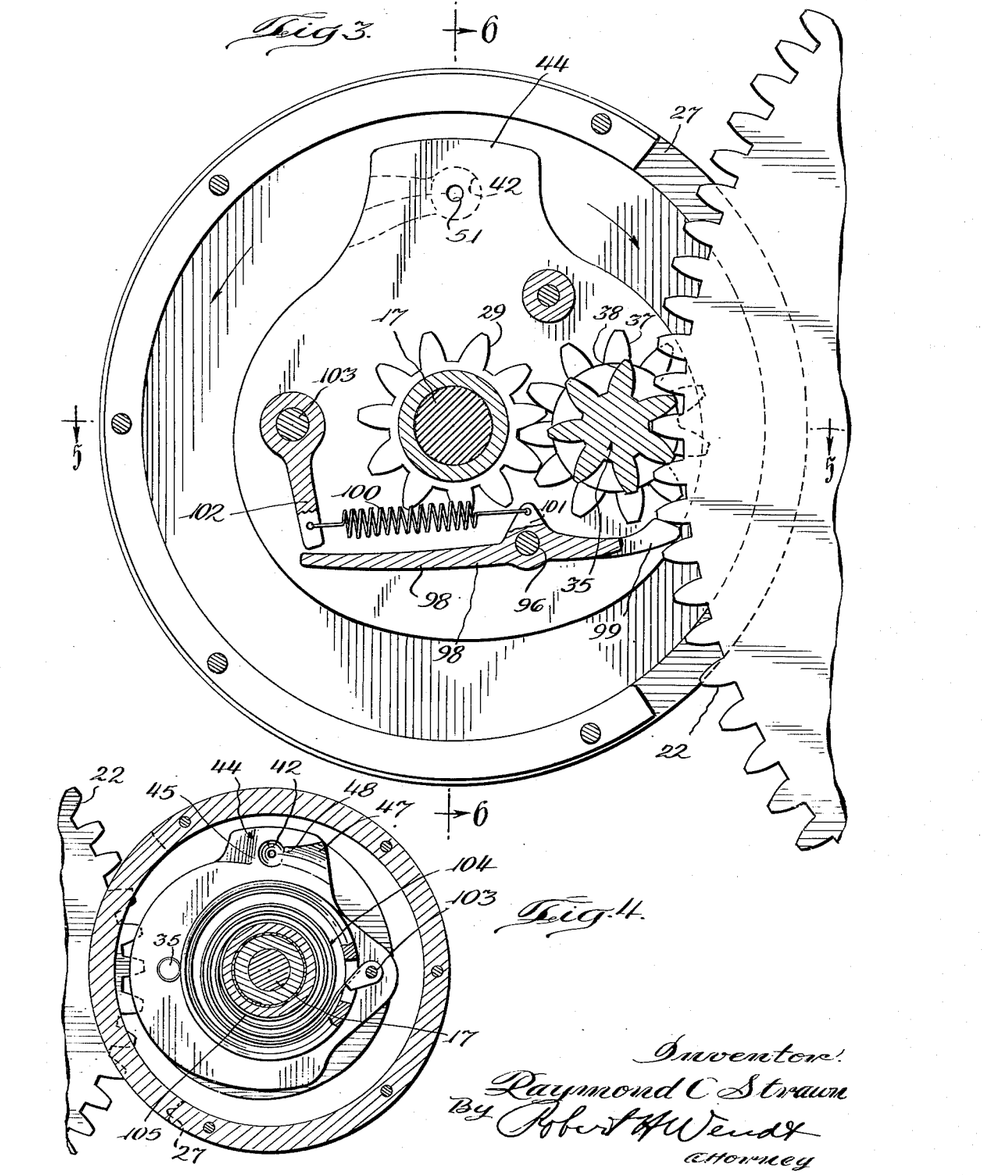
Fig. 3 is a fragmentary sectional view, taken on the plane of the line 3—3 of Fig. 6, looking in the direction of the arrows.
Fig. 4 is a fragmentary sectional view on a smaller scale, taken on the plane of the line 4—4 of Fig. 6, looking in the direction of the arrows.
Figures 5, 8, 9, 10:
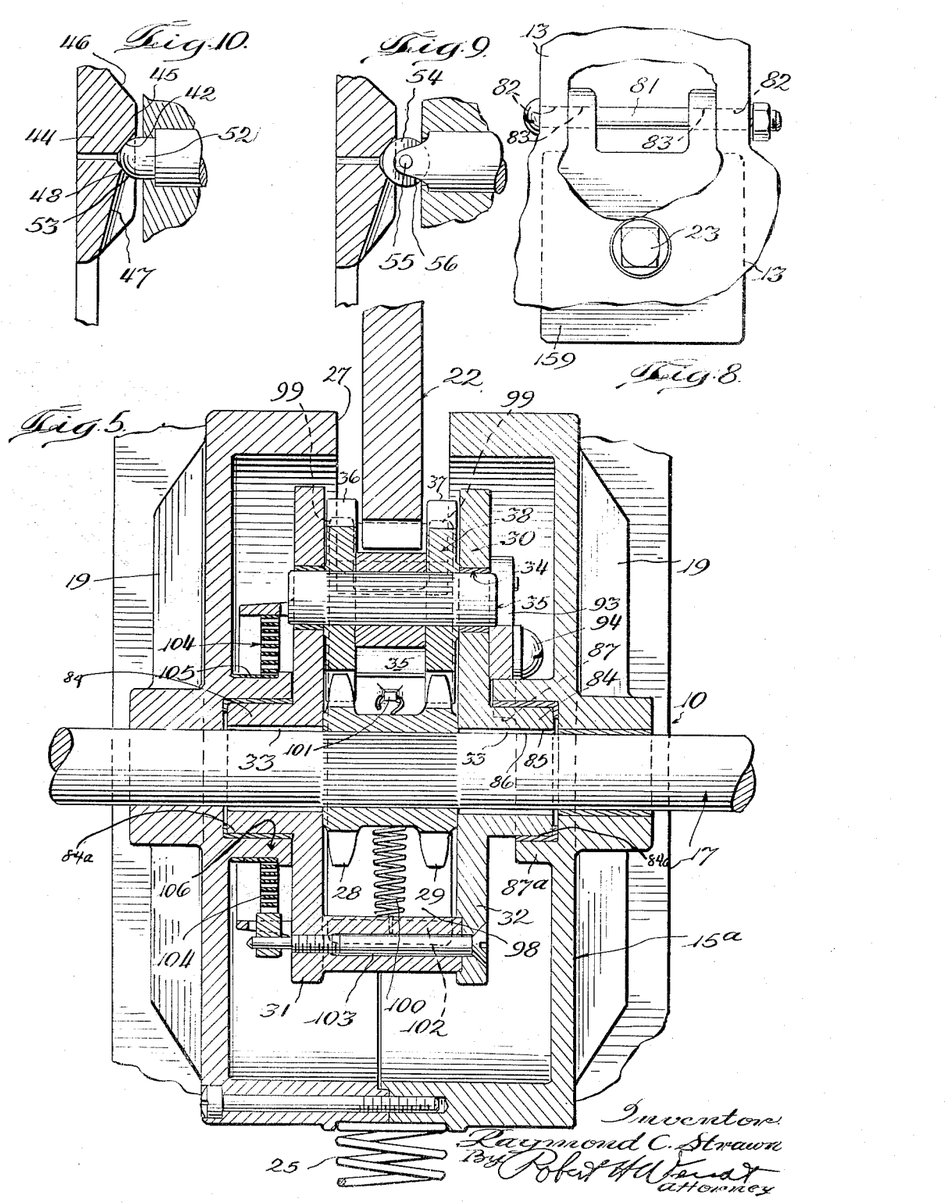
Fig. 5 is a fragmentary sectional view, taken on the plane of the line 5—5 of Fig. 3, looking in the direction of the arrows.
Fig. 8 is a fragmentary elevational view of an alternative form of transmission mounting, showing a modification in which the transmission housing is pivotally mounted instead of slidably.
Fig. 9 is a fragmentary sectional view, taken on a plane similar to Fig. 6, showing alternative forms of the retaining mechanism which holds the planetary transmission device in the driving position.
Fig. 10 is a view similar to Fig. 9 of another modification of this retaining mechanism.

Referring now to Figs. 5 and 6, here the planetary drive mechanism is shown in greater detail. The side plates 31, 32 of the planetary frame may, as shown in Fig. 3, comprise substantially circular or oval plates provided at one side with a radially projecting body 44 of sufficient size to be provided with the socket 42 or 43 and with suitable camming surfaces leading to and from this socket in a peripheral direction.

Such a projecting body is shown in section in Figs. 9 and 10. The sockets 42 and 43 are preferably partially circular or conical so that they are adapted to cam the plungers 40 or 41 backward to permit the plunger to pass out of the socket upon application of a predetermined force.

Upon one side of the socket, that is, the top side, in Fig. 10, the full depth of the socket 42 is utilized, and the plunger must be cammed backward until it reaches a position flush with the outer surface 45 of a side plate, before the plunger is released from the socket.

Thereafter the plunger may pass peripherally across the surface 45 and may engage a camming surface 46 that permits the plunger to be ejected to its normal projecting position and enables the plunger to act on the planetary frame, tending to cause a rotation of the planetary frame in the direction in which it is moving. This feature requires less pressure on the gear retarder, since it aids in the transfer of motion from the gears to the planetary frame.

A full depth of the socket 42 or 43, as described, reacting in a camming manner against the plungers, is preferably employed as a retaining means for holding the planetary frame in the driving position against over-load; and the camming action just described is that which is brought about over-load, which may cause the plungers to be cammed out of the sockets 42 and

43, to relieve the mechanism from the strains caused by over-load.

Then the planetary frame is free to rotate on its own axis about the main shaft 17, until it reaches a new driving position; but such rotation is preferably assured by providing a means for gradually transferring the torque of the pinion 38 to the planet frame, as will be further described.

Referring again to Figs. 6 and 10, a gradually sloped groove or camming surface 47 on a side plate 31 or 32 adjacent, and leading to a socket 42 or 43, is located on the leading side of the socket 42; that is, the side toward which the plungers move when they are moving into the sockets 42 or 43.

This camming surface 47 gradually cams the plungers 40, 41 backward, due to the load draft of the driven member and power torque, until they pass over a hump 48 into the sockets 42 or 43. Since the hump 48 is of less height than the outer rim of the socket 42 or 43, the plungers 40 or 41 may be cammed backward over the hump 48 more easily than they can pass forward or upward in Fig. 10.

This characteristic is preferably employed for effecting a release of the mechanism from the engine when the engine becomes a power source. Whenever the engine starts while the motor 12 is driving the main shaft 17, the plungers 40, 41 are adapted to be cammed backward by the hump 48, and thus the planetary frame may be released for oscillation, thus relieving the pinion 38 and other parts from the strain caused by the forward surge of the started engine.

Various forms of plunger heads and sockets may be employed, and Figs. 6, 9, and 10 show different forms of plunger heads. For example, the plunger heads 49 and 50 of Fig. 6 are substantially conical or complementary to the conical sockets 42, 43. These sockets terminate in through apertures 51 for discharge of refuse. This is an air or oil release so that the plungers will not bounce when snapping into the sockets.

Referring to Fig. 10, the plunger head 52 in this case has a partially spherical end surface 53, which operates in the same way as the plunger head 49.

Referring to Fig. 9, here the plunger head comprises a roller 54 suitably mounted on a pintle 55 carried by bearing flanges 56. In this case the roller 54 is arranged to rotate in the direction of the periphery of the planetary frame. If the pintle is at 90 degrees relative to the main shaft, the roller should be tapered; but if the roller is parallel to the main shaft, it should be straight.

The plungers 40, 41 may thus be provided with different types of camming heads, but all of them preferably include the following structure, as best shown in Fig. 6. The housing 15 is provided with suitable cylindrical bores 57 terminating in a smaller counterbore 28 and having an annular stop shoulder 59, but the roller plungers are keyed against rotation in their bores.

Each plunger head, such as plunger head 50, has an annular stop surface 60 for engaging the stop shoulder 59 so that the inward motion of the plungers is limited by these shoulders, thus retaining them in repeatable operable assembly.

The plunger head 50 may have a cylindrical socket 61 for receiving a compression spring 62, which reacts against a threaded nut 63, the nut being threaded into the threaded portion 64 of bore 57. Thus the plunger head 50 is constantly urged inward, but is limited in its inward motion by the shoulders 59 and 60.

The same is true of the plungers illustrated in Figs. 9 and 10, which are provided with similar springs and stops and mounted in similar bores. The roller plungers are keyed against rotation in their bores so that the rollers will roll properly on the planetary frame.

In order to provide for the manual or automatic control of these plungers, each plunger is preferably provided with a threaded bore 65 for receiving the threaded end of a connecting rod 66. Thus the connecting rods may be used for retracting the plungers 40, 41 at will to release the retaining mechanism that is holding the gears in driving engagement.

Figure 12:
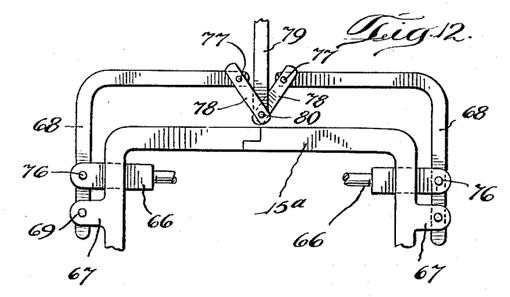
Fig. 12 is a fragmentary plan view of interconnecting mechanism by means of which the retaining members of Figs. 9 and 10 or 6 may be connected to be controlled by any suitable controlling device.

Referring to Fig. 12, this shows a connecting mechanism by means of which both plungers may be simultaneously controlled. A fragment of the housing is shown, and this housing is provided with outwardly projecting pivot ears 67.

Figures 22, 24:
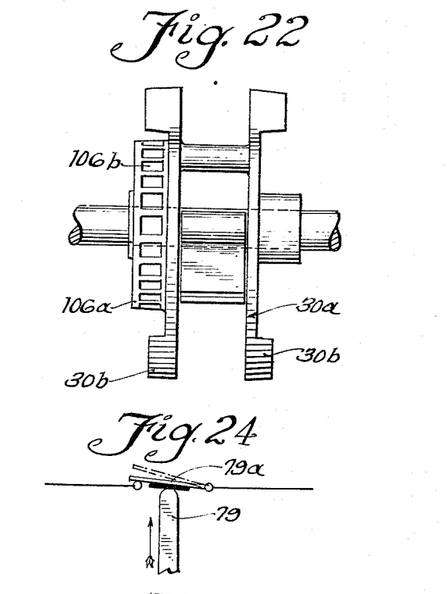
Fig. 22 is a fragmentary elevational view of a planetary frame housing showing how it may be counterbalanced and how it may be constructed to discharge refuse.
Fig. 24 is a fragmentary diagrammatic view showing how the control rod 79 of Fig. 12 may be used to open a power switch for cutting off the power or tripping other safety devices.

The rods may in turn control something outside, such as an electric safety switch to shut off power energy. Fig. 24 shows an arrangement in which the rod 79 connected to the plungers, as shown in Fig. 12, is arranged to control an electric switch 79a, which it opens to shut off power to the motor 12, or to trip other safety devices.

An angle lever 68 is pivotally mounted at 69 on each pivot ear. The angle levers 68 are pivotally connected by means of a pin and slot at 70 to the pull rods 66. The end of each angle lever is connected pivotally at 77 to a link 78. The links 78 are pivotally connected together and to a connecting rod 79 by means of a pintle 80.

Figures 23, 25:
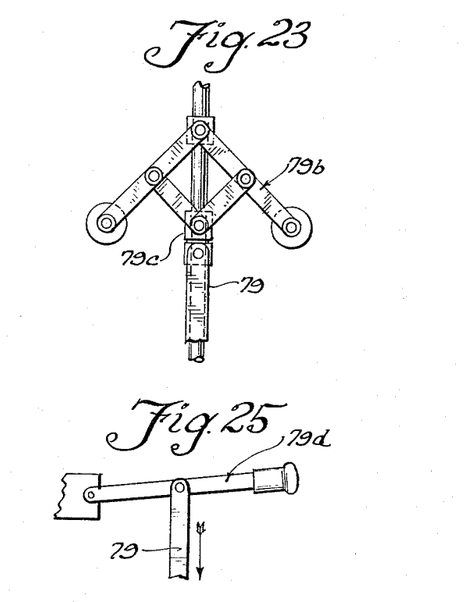
Fig. 23 is a fragmentary elevational view showing how the lever system of Fig. 12 may be controlled through the connecting rod 79 by a speed responsive device.
Fig. 25 is a fragmentary elevational view showing how the control rod 79 of Fig. 12 may be controlled by a manual device.

Pulling upward on the rod 79 causes the angle levers 68 to spread and to pull both plunger rods 66 outward. The motion of the connecting rod 79 may be controlled by any suitable controlling devices, such as, for example, a speed responsive element, a manual lever, a vacuum control unit, a magnetic mechanism, or a pressure responsive device. Referring to Fig. 23, this is a fragmentary illustration of a flyball governor 79b, the sliding member 79c of which is arranged to control the movement of rod 79 and through it plungers 40, 41.

Referring to Fig. 25, this is a fragmentary view showing how a manual lever 79d can be arranged to control the rod 79 and plungers 40, 41.

Figure 26:
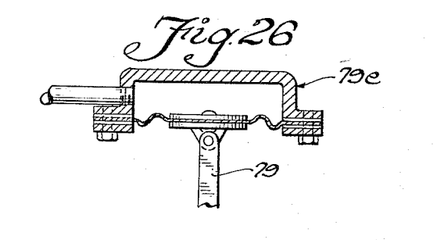
Fig. 26 is a fragmentary sectional view showing how the plungers may be controlled through the rod 79 by means of a vacuum control unit.
Figure 27:
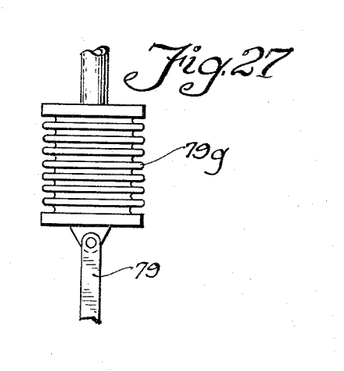
Fig. 27 is a fragmentary elevational view showing how the plungers controlled by rod 79 may be controlled by a pressure responsive device.
Figure 28:
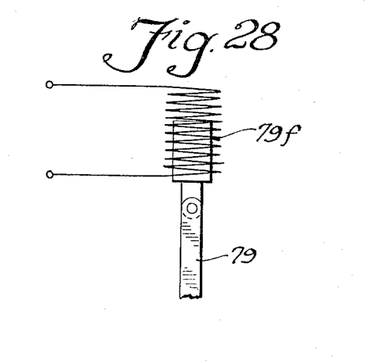
Fig. 28 is a fragmentary diagrammatic view showing how the connecting rod 79 may be controlled by a magnetic mechanism.

Referring to Fig. 26, this is a fragmentary illustration in which rod 79 is controlled by the diaphragm of a vacuum control unit 79e. Referring to Fig. 28, this is a diagrammatic illustration of a control unit in which the rod 79 is controlled by a magnetic mechanism 79f, comprising a solenoid and plunger. Referring to Fig. 27, this is a fragmentary view in which the rod 79 is controlled by a pressure responsive bellows 79g.

Thus the present power transmission device may be controlled and disconnected by any of these controlling units merely by withdrawing the plungers 40, 41, which hold the planetary frame in the driving position; and when these plungers automatically are kicked open, then can trip safety units outside too, and shut off the power, as shown in Fig. 24.

Figures 11, 13, 14:
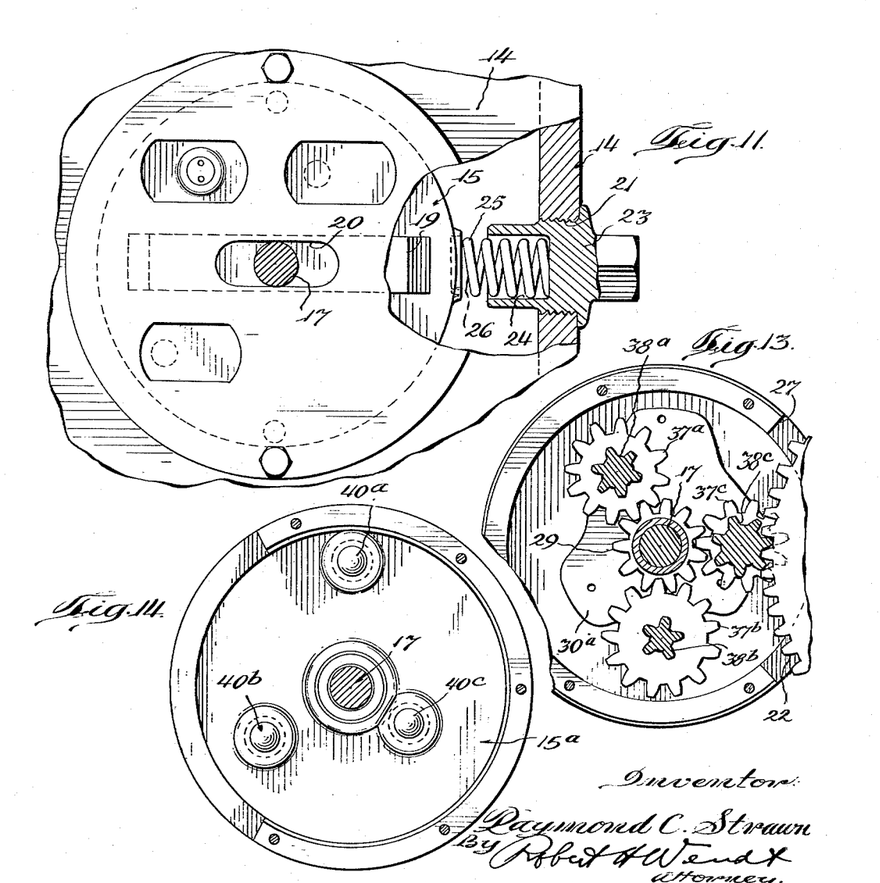
Fig. 11 is a fragmentary side elevational view of the housing and its support, showing how the gears are spring pressed toward the flywheel, but are permitted to give, in case two teeth strike each other head on, instead of meshing in the gears between the teeth.
Fig. 13 is a fragmentary sectional view taken on a plane similar to Fig. 3, showing the modified form of mechanism in which a plurality of different speeds of drive may be employed.
Fig. 14 is a sectional view, taken on a plane similar to Fig. 7, showing the plungers, which act as retaining means for holding the gears in mesh while driving the flywheel.

Referring to Fig. 8, this is a modification of the mechanism shown in Fig. 11, in which the chassis 13 pivotally supports the housing 15a by means of a pintle bolt 81, passing through bearing bores 82, 83. In this case the chassis frame is provided with the same spring-supporting plug 23 for urging the housing 15a toward the flywheel, the difference being that the housing 15a is supported for pivotal movement instead of sliding movement, as shown in Fig. 11, and outside contours are flat.

When the planetary frame 30 and pinion 38 are in the driving position shown in Fig. 1 and the frame 30 is being held in such position by the plungers 40, 41, all power must be transmitted to the flywheel 22 through the pinion 38.

Upon the occurrence of an over-load or a backfire or upon the withdrawal of the plungers 40, 41 manually or by some controlling unit, the rotative forces applied to the pinion 38 either by the flywheel or the starter motor 12 will cause the planetary frame 30 to rotate on its own axis about the shaft 17, until the pinion 38 no longer engages the flywheel gear 32. Then both the planetary pinion 38 and the planetary frame 30 would be free to rotate; and in order to insure the rotation of the planetary frame around into position for driving engagement again, the mechanism is preferably provided with a means for retarding the pinion 38 against rotation except when it is in driving engagement with the flywheel gear 22.

Such a mechanism, shown in Figs. 2, 3, 4, and 7, will now be described. The side plate 32 is preferably provided with an axially projecting cylindrical hub 84, which may have an enlarged bore 85 providing a clearance 86 about shaft 17. Side plates 31, 32 are given bearing support at the outside of their hubs 84, in bearing bores in housing 15a. Thus shocks on the planetary system are transmitted to the housing instead of the main shaft 17.

On the inner wall of the housing 15a there is an inwardly projecting cam 87, which may form an axial extension of the hub 87a (Fig. 6). The peripherally extending cam 87 (Fig. 7) is relatively short and provided with a short cylindrical dwell 88. At its lower end (Fig. 7) the cam 87 has a sloping camming surface 89; and at its upper end (Fig. 7) the cam 87 has a backward bevel 90 forming a relatively sharp edge 91, or acute angle.

The acute angle 91 is adapted to be engaged by the hook 92 (Fig. 7) of a follower 93, which is pivoted by means of pintle 94 on the side plate 32. Thus the hook 93 is carried by the rotating planetary frame 30 in position to engage the cam 87 and to hook on the acute angle 91 so that rotation in a reverse direction is prevented by the engagement of the hook 92 with the edge 91 on the housing. This feature is only required when the driven member becomes self-active, a multiple cam is employed with multiple gear combinations (Fig. 13).

Rotation in the forward direction, that is, clockwise in Fig. 3, is permitted, since the end of the hook 92 will ride upward on the camming surface 89 to the cylindrical dwell 88. The location of the cylindrical dwell 88 with respect to the hook 92 of follower 93 is such that the follower 93 is on the cylindrical dwell 88, when the planetary frame and pinion 38 are in the driving position; but when the planetary frame 30 is forced forward by over-load, which would cam a plunger head 52 upward in Fig. 10, out of socket 42, the hook 92 will then pass over the acute angle 91 of cam 87 and prevent the planetary frame from rotating backwards, in this particular instance.

Figure 7:
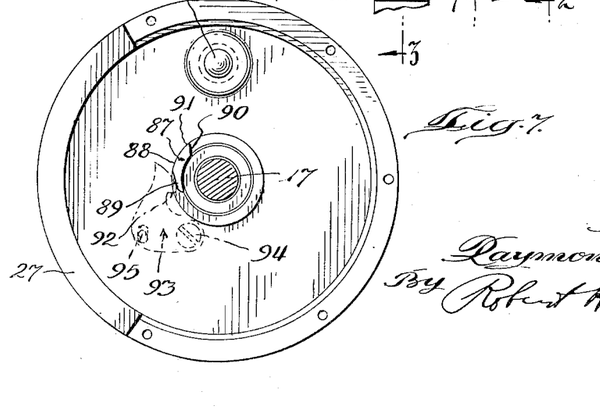
Fig. 7 is a fragmentary sectional view on a smaller scale, taken on the plane of the lines indicated at 7—7 in Fig. 6, looking in the direction of the arrows.

At the same time it should be noted that the follower 93 is passing off the cam 87 in Fig. 7, and this movement is utilized to control a means for retarding the pinion 38 against rotation, until the follower 93 again rides up on the cam 87. For this purpose the follower 93 is provided with a hole for a pin 95 secured fixedly to the retarder 99 and extending through the side plate 32 adjacent the pinion 38.

Referring to Fig. 6, the follower 93 is there shown in section, pivotally secured to the bolt 96, which is provided with a reduced cylindrical end 97, having a bearing in the aperture in the other side plate 31. Between the side plates 31 and 32 (Fig. 6) the bolt or shaft 96 carries a retarding lever 98, which may be seen in longitudinal section in Fig. 3.

This retarding lever has its right end in Fig. 3 bifurcated, one of its legs being shown at 99, so that these legs may straddle the flywheel gear 22. The legs 99 are in position to engage the teeth of the two gears 36 and 37, and thus to retard these gears whenever the cam follower 93 is off the dwell 88 of the cam 87.

The follower 93 is preferably urged into engaging position with the cam 87 and the retarding lever 98 also urged toward the gears, which its legs 99 are intended to engage by means of a spring, such as the spring 100 (Fig. 3), one end of which is hooked in an aperture in a lever side extension 101, and the other end of which is hooked in a spring-supporting member 102, which is carried by a transverse bolt on the rotor housing.

The transverse bolt 103 extends from one side plate 32 to the other side plate 31, and also serves (Fig. 4) as a fixed abutment for supporting the outer end of a spiral spring 104, which is located on the other, or left side of the device, as shown in Fig. 4 and Fig. 6.

The spiral spring 104 has convolutions of gradually decreasing radius, until its innermost turns 105 are of such size that they frictionally engage an inwardly extending hub 106 (Fig. 6) carried by the left side of the housing 15a.

The spiral spring 104 has its inner helical coils in frictional engagement with the hub 106 in such manner that when the planetary frame 30 is released, due to an over-load, the planetary frame 30 rotates in such manner as to rotate the fixed abutment 103 of the spring 104; but when the planetary frame 30 is released in the opposite direction by a back-fire or a kick-back, the spring rotates on the hub 106 with the planetary frame.

The spring urges against engagement of pinion 38 and the driven member. When the mechanism is still, spring 104 constantly urges pinion 35 away from gear 22. When the power source is energized, it overcomes this urge and shifts pinion 35 approximately into engagement with gear 22.

Then, if gear 22 is moving from backward inertia, it will carry pinion 35 past its regular driving position. It also starts unwinding spring 104, causing expansion of spring 104. This expansion is checked by annular lip 106a on the planetary frame, causing the expansive action to reverse through the spring to its hub wound portions, thus expanding them and somewhat loosening their grip on the hub; and thereafter the spring follows the rotation of the planetary frame, thus resetting itself under tension, and permitting the spring to choose its proper stopping place. Housing 106a may be constructed to discharge refuse.

Fig. 22 shows the planetary cage 30a provided with housing 106a for the spring 104, in which the housing is provided with a multiplicity of apertures 106b for discharging refuse which might otherwise interfere with the operation of the spring 104.

Figure 15:
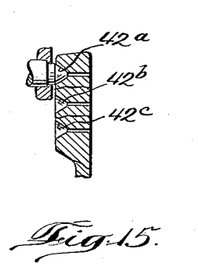
Fig. 15 is a fragmentary sectional view, taken on a plane similar to Fig. 6, showing one of the retaining plungers of Fig. 14 and a plurality of sockets which are disposed at different radii and on different radii for cooperation with the retaining members of Fig. 14.

Referring to Figs. 13, 14, and 15, this modification illustrates the use of a plurality of driving pinions of different size, each of which is located at a different point circumferentially of the main shaft 17, and each of which is adapted to mesh with the flywheel gear 22.

In such case the shafts, which support these auxiliary gears 38a, 38b, and 38c, are located at a suitable radius from the axis of the shaft 17 so that any one of these three pinions can be brought into driving engagement with the flywheel gear 22.

The side gears 37a, 37b, and 37c, which are fixedly secured to the pinions 38a, 38b, and 38c, respectively, must naturally be of different size, appropriate for the radius with which they are located with respect to the shaft 17, so that all of these side gears are adapted to mesh with the side gears 28 and 29 that are attached to the main shaft.

These do not need to be of different size. They can be separate sets of gears on the main shaft for each counter-shaft, with a different gear combination for each planetary assembly.

In order to hold such gears in driving engagement, the outside of the planetary frame 30a is preferably provided with a plurality of sockets 42a, 42b, and 42c, as shown in Fig. 15. These sockets are to be engaged by plungers 40a, 40b, and 40c (Fig. 14), which are carried on different radii by the side wall of the housing 15a; or if the holding values of the plungers are to be the same to each assembly, only one set is needed.

It will be noted that the sockets 42a, 42b, and 42c are at different radii, and the plungers 40a, 40b, and 40c are at different radii. Thus each plunger will only engage its proper socket, also the leverage between the driving and driven member is varied, since the stations measure differently from the main axis.

It will also be noted that the sockets and plungers must be so located relative to the gears that, when the plunger 40a is in socket 42a, the pinion 38a is in driving engagement with the flywheel gear 22; and also due to the fact that the gears are at different positions, the leverage is varied between the driving and the driven member.

When the plunger 40b is in its socket 42b, then the pinion 38b is in position for driving engagement with the flywheel gear 22. When the plunger 40c is engaged in the socket 42c, then the pinion 38c is in driving engagement with the flywheel gear 22.

Since the driving pinions are of different sizes, and the gears are at different radii, it will be evident that this transmission may be used for providing different speeds and leverages between the prime mover and the driven member, or varied speeds.

The operation of my transmission is as follows: The planetary frame 30 rotates or oscillates on its own axis about the main shaft 17, carrying with it the driving pinion 38, which describes a revolution in a circular orbit. When the main shaft 17 is driven by the starter motor 12, this motion may accomplish two different things. (First) if the planetary frame 30 is held fixed, shaft 17 rotates gears 28 and 29, which engage and rotate gears 36 and 37, which carry with them pinion 38.

Pinion 38 then rotates and drives gear 22. (Second) If the planetary frame 30 is permitted to rotate, and if the shaft rotates clockwise, looking at Fig. 1 from the right side, gears 28 and 29 rotate clockwise, gears 36 and 37 rotate counterclockwise, pinion 38 rotates counterclockwise, pinion 38 cannot drive gear 22 because as the teeth of the pinion tend to urge the teeth of gear 22 clockwise, the reaction on the frame 30 causes the frame 30 to rotate counterclockwise, causing the pinion 38 to walk out of engagement with the gear 22.

The momentum which is gained by frame 30 is usually sufficient to carry frame 30 through a complete rotation; but in any event, when the pinion 38 gets out of engagement with the driven gear 22, pinion 38 is locked against rotation by the tooth retarder 98 until the frame 30 makes a complete rotation and brings the pinion 38 again into engagement with the gear 22.

The arrangement of the gearing and its assembly in the planetary frame are such as to permit free pivotal entry and escape from the flywheel 22, against the rotation of the driving member. It also permits the overload structure to function properly. The coupling may also be reversed in function to perform as an overdrive connection.

If the pinion 38 is in the position of Fig. 1, engaging the flywheel gear 22, then the flywheel gear may be driven by the starter motor 12 as long as the planetary frame 30 is held fixed.

The planetary frame 30 is so held by the plungers 40 and 41 engaging in sockets 42 and 43; and it should be noted that the arrangement shown in Fig. 6, with plungers on opposite sides, places no strain or thrust on the rotor's axis. The pressure of one plunger 40 is opposed and balanced by the other plunger 41. These sockets and plungers may be placed at any angle, as long as one is kept operable with the other.

Whenever an over-load occurs, the plungers 41, 42 are cammed outward by the camming surfaces of the sockets, until the plungers pass over the flat surface 45, and the plungers ride on the camming surface 46. Then the springs of the plungers give the rotor an additional rotative impulse to coincide with the main shaft. When the camming force exerted on the ends of the plungers becomes strong enough to move the plungers relative to their sockets, the power torque is applied to the planetary frame about the axis of shaft 17 and runs the pinion 38 out of engagement with the gear 22. The inclined camming surfaces 46, acted on by the plungers, tends to rotate the planetary cage away from the plungers by virtue of the expansive action of the plungers, tending to match the speeds of the driving member 12 and the planetary frame 30.

While the pinion 38 is in the driving position of Fig. 1, the follower 93 (Fig. 7) is on the dwell 88, thereby rotating the shaft 94 to such a position that the gear retarder 98 (Fig. 3) has its friction surfaces 99 out of engagement with the gears 36 and 37.

Spring 100 is constantly urging gear retarder 98 toward engagement. This engagement urges follower 93 toward its cam; and as soon as the over-load or any other rotative force exerts sufficient torque on the planetary frame 30 to cause the sockets 42, 43 to cam the plungers 40, 41 out of the sockets, then the planetary frame 30, urged by the driven member, rotates far enough to carry the pinion 38 out of engagement with flywheel gear 22. At the same time the follower 93 rides off its cam 87 (Fig. 7), causing a slight rotation of the shaft 94, which rotates the gear retarder 98 until its legs 99 engage and resiliently retard the gears 36 and 37 and apply this effort to the rotor housing, since the retarding means is operably anchored to this rotor housing at 94.

Thus the pinion 38 and gears 36 and 37 are resiliently retarded against rotation as soon as the pinion 38 gets out of engagement with the flyweight gear 22.

When the pinion 38 and gears 36, 37 are retarded against rotation, sufficient power applied to the shaft 17 will cause a rotation of the planetary frame 30; and this further rotation of the planetary frame will cause it to make a complete revolution until the pinion 38 again comes back into driving engagement and is released by its retarding lever 98 because the follower 93 has again ridden up on the cam surface 88.

The spacing of the shafts 17, 35, and 39 and the size of the gears 22 and 38 is such that when these shafts have their axes in the same plane the gears 38 and 22 mesh; and the planetary frame 30 may then by its rotation move the pinion 38 into or out of engagement with the gear 22. If the teeth of pinion 38 and gear 22 meet head on, then the spring 25 gives, and frame 15 permits the pinion 38 to recede from the gear 22 momentarily until their teeth mesh.

Whenever the starter motor 12 is driving and the engine 11 back-fires, the plungers 40, 41 are cammed over the full hump in the opposite direction, and the pinion 38 is rotated out of driving engagement with the flywheel gear 22.

When the starter motor is driving and the engine starts, the plungers 40, 41 are cammed over the lower hump; and the engine, becoming a source of power, rotates the pinion 38 out of driving engagement with the flywheel.

The rotation of the planetary frame 30 in this case is opposite to its over-load rotation and opposite to the desired normal rotation of the frame; and therefore the spring 104 has its clutch coils 105 clutching the hub 106 until the spring 104 is tensioned over a rotation of about one hundred and eighty degrees or less.

It will thus be observed that the present planetary transmission is adapted to effect an automatic release between the starter motor and the engine flywheel upon over-load or upon back-fire, or when the engine starts under its own power. It is also adapted to bring the driving gears automatically into re-engaging position over and over again, without possibility of damage to any of the parts.

If the over-load continues, it will be sufficient to cause the rotor to cam past the plungers 40, 41 again and again. Whenever a back-fire takes place and a reverse action is brought to bear against the gears, the device also effects an automatic release and complete disconnection between the starter motor and engine; and after a short lapse of time the transmission is again connected between the starter motor and the engine in driving position.

The present device is simple; it has a minimum number of parts, and it is adapted to be used for a long period of time without any possibility of the gears locking.

The present device can be used in series, or paralleled and at common angles, or angles in common.

Figure 17:
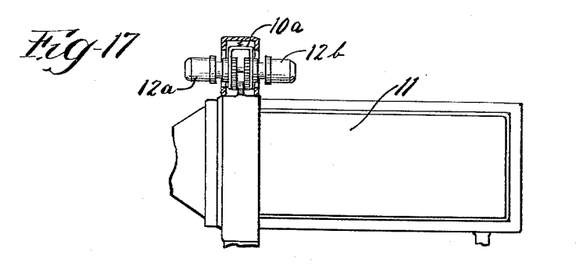
Fig. 17 is a diagrammatic plan view in partial section, illustrating the application of a pair of the present devices to a driven gear, such as an internal combustion engine, in parallel.

Referring to Fig. 17, this shows my transmission 10a driven by two motors 12a, 12b in parallel on the same shaft.

Figures 18, 21:
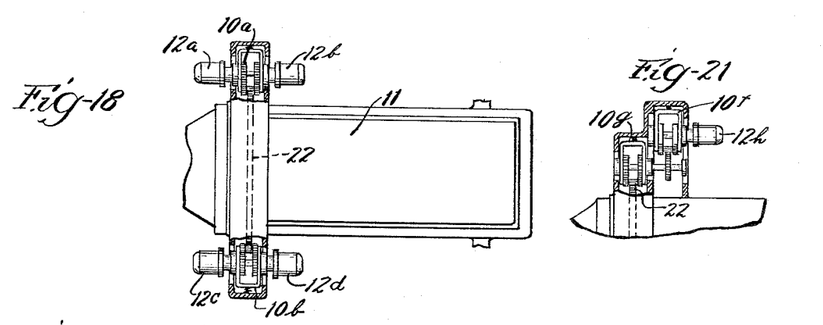
Fig. 18 is a similar view, showing the application of four of such devices in parallel, with one driven gear.
Fig. 21 is a fragmentary sectional view showing the application of two motor driven devices embodying the invention in series to a driven gear.

Referring to Fig. 18, this shows two of the driving assemblies of Fig. 17 in parallel with relation to gear 22. Motors 12a and 12b drive gear 22 through transmission 10a. Motors 12c and 12d drive the same gear 22 through transmission 10b.

Figure 19:
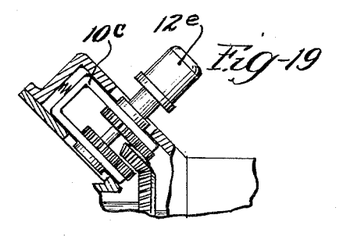
Fig. 19 is a fragmentary view showing the application of one of the devices to a driven gear at a common angle.

Referring to Fig. 19, this shows motor 12e and transmission 10c arranged at the common angle of 45 degrees.

Figure 20:
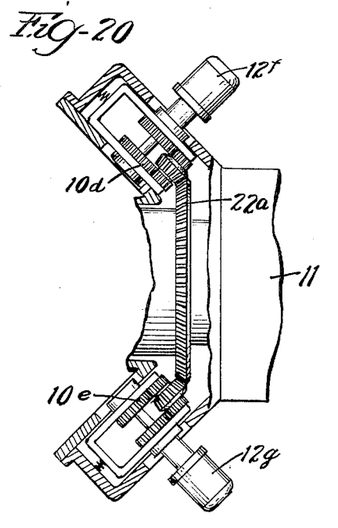
Fig. 20 is a similar view showing the application of two such devices to a driven gear at angles in common.

Referring to Fig. 20, this shows gear 22a driven by two devices in parallel and arranged at angles in common. In this case the motors are 12f and 12g, which drive bevel gear 22a through transmissions 10d and 10e, respectively.

Referring to Fig. 21, this shows a single motor 12h driving gear 22 through two of my transmissions 10f and 10g in series.

The present device can also be counterbalanced to avoid vibration, whenever such a condition may occur. Such a counterbalance for the planetary housing 30a is illustrated in Fig. 22, where this housing is provided with counterbalance weights 30b.

The driving gears may be meshed together without damage when either or both the prime mover or driven member are rotating at a high speed. It is not necessary to process the end of the gears for longitudinal meshing action; and the presence of dirt or other foreign matter upon the gears or other parts will not affect their operation.

The present power transmission may be controlled in regard to disconnection by any kind of controlling devices which are adapted to actuate or withdraw the plungers that retain the planetary rotor in the driving position. The motion of the coupling into driving engagement being accomplished automatically, it is only necessary to control the plungers for disengagement of the drive.

The present application is intended to include all patentable subject-matter of said prior application.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, a drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position.

2. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and releasable means operating between the planetary frame and said housing to hold the planetary frame in said meshing position.

3. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and releasable means operating between the planetary frame and said housing to hold the planetary frame in said meshing position, said releasable means comprising a tapered socket and spring pressed member with a camming end engaged in said tapered socket.

4. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and releasable means operating between the planetary frame and said housing to hold the planetary frame in said meshing position, said releasable means comprising a tapered socket and spring pressed member with a camming end engaged in said tapered socket, said tapered socket having a lower camming formation on one side to receive the spring pressed member when the planetary frame rotates.

5. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, the said housing, planetary frame, and motor being carried by a sliding frame, said sliding frame being mounted for translation upon said housing toward and from the starter gear, and translation taking place when the teeth of the planetary gear and the starter gear engage at tooth ends.

6. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, the said housing, planetary frame, and motor being carried by a sliding frame, said sliding frame being mounted for translation upon said housing toward and from the starter gear, and translation taking place when the teeth of the planetary gear and the starter gear engage at tooth ends, and resilient means for causing said translation toward said starter gear.

7. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh wtih said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and resilient detent means carried by said housing and engaging said planetary frame, for holding the planetary frame against rotation until a predetermined rotative torque is applied to the planetary frame, the drive shaft driving the starter gear through the planetary gear while the planetary frame is so held.

8. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and resilient detent means carried by said housing and engaging said planetary frame, for holding the planetary frame against rotation until a predetermined rotative torque is applied to the planetary frame, the drive shaft driving the starter gear through the planetary gear while the planetary frame is so held, said resilient detent means comprising a pair of spring pressed plungers engaging in depressions in the opposite sides of the planetary frame.

9. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and resilient detent means carried by said housing and engaging said planetary frame, for holding the planetary frame against rotation until a predetermined rotative torque is applied to the planetary frame, the drive shaft driving the starter gear through the planetary gear while the planetary frame is so held, said resilient detent means comprising a pair of spring pressed plungers engaging in depressions in the opposite sides of the planetary frame, the said depressions being formed with camming shoulders projecting different distances toward the spring pressed plungers at the leading end, and the trailing end of each depression having reference to the direction of rotation, and a different torque being required to cause the planetary frame to be released to rotate backwards from the torque which is required to rotate it frontwards.

10. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and a tooth retarding device comprising a movable stop located to engage the driven gear teeth, to hold the planetary gear against rotation, except when it is engaging the driving gear.

11. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and a tooth retarding device comprising a movable stop located to engage the driven gear teeth, to hold the planetary gear against rotation, except when it is engaging the driving gear, said tooth retarding device being controlled by a cam which is operable on rotation of the planetary frame, to control the position of said tooth retarding means.

12. In a planetary motor starting device, the combination of a support, a starter motor carried by said support and having a drive shaft, a housing carried by said support and having bearing surfaces concentric with said drive shaft, a planetary frame mounted for rotation about said drive shaft on said bearing surfaces of said housing, a planetary gear rotatably mounted on said planetary frame on an axis parallel to, but spaced from, the drive shaft axis, a driving gear carried by the drive shaft and meshing with a driven gear connected to said planetary gear, an internal combustion engine carried by said support and provided with a starting gear located to mesh with said planetary gear, the spacing of the gear axes being such that the axes of the planetary gear, driving gear, and starter gear may be in the same plane when the starter gear is actuated, and the planetary gear may pass through starter gear meshing position as the planetary frame rotates, the said starter motor rotating said planetary frame to bring the planetary gear into mesh with the starter gear, and thereafter the planetary gear driving the starter gear, while the planetary frame remains in meshing position, and spring means reacting against said support and urging the planetary frame in such direction as to hold the planetary gear out of engagement with the starting gear, rotation of the drive shaft moving the planetary frame in the opposite direction, to bring the planetary gear into engagement with the starting gear.

13. In a planetary power transmission device, a support, a driven shaft having a driven gear, a drive shaft, a housing carried by said support and having bearing surfaces concentric with said drive shaft, a planetary frame mounted about said drive shaft on said bearing surfaces of said housing, a drive gear rotated by the drive shaft, a planetary gear rotatably carried by said planetary frame, and meshing with said driven gear when the planetary frame is in meshing position, the spacing of the gear axes being such that the axes of the planetary gear, drive gear, and driven gear may be in the same plane when the driven gear is actuated, and the planetary gear may pass through the driven gear meshing position as the planetary frame rotates, rotation of the planetary frame moving the planetary gear out of meshing position, and continued rotation moving it again into meshing position, and a gear meshing with the drive gear and mounted to rotate said planetary gear, rotation of the drive shaft tending to rotate the planetary frame and to rotate the planetary gear.

14. In a planetary power transmission device, a support, a driven shaft having a driven gear, a drive shaft, a housing carried by said support and having bearing surfaces concentric with said drive shaft, a planetary frame mounted about said drive shaft on said bearing surfaces of said housing, a drive gear rotated by the drive shaft, a planetary gear rotatably carried by said planetary frame, and meshing with said driven gear when the planetary frame is in meshing position, the spacing of the gear axes being such that the axes of the planetary gear, drive gear, and driven gear may be in the same plane when the driven gear is actuated, and the planetary gear may pass through the driven gear meshing position as the planetary frame rotates, rotation of the planetary frame moving the planetary gear out of meshing position, and continued rotation moving it again into meshing position, and a gear meshing with the drive gear and mounted to rotate said planetary gear, rotation of the drive shaft tending to rotate the planetary frame and to rotate the planetary gear, said housing carrying a spring pressed detent, and said planetary frame having a tapered detent socket located to hold the planetary frame in meshing position, with the planetary gear meshing the driven gear.

15. In a planetary power transmission device, a support, a driven shaft having a driven gear, a drive shaft, a housing carried by said support and having bearing surfaces concentric with said drive shaft, a planetary frame mounted about said drive shaft on said bearing surfaces of said housing, a drive gear rotated by the drive shaft, a planetary gear rotatably carried by said planetary frame, and meshing with said driven gear when the planetary frame is in meshing position, the spacing of the gear axes being such that the axes of the planetary gear, drive gear, and driven gear may be in the same plane when the driven gear is actuated, and the planetary gear may pass through the driven gear meshing position as the planetary frame rotates, rotation of the planetary frame moving the planetary gear out of meshing position, and continued rotation moving it again into meshing position, and a gear meshing with the drive gear and mounted to rotate said planetary gear, rotation of the drive shaft tending to rotate the planetary frame and to rotate the planetary gear, said housing carrying a spring pressed detent, and said planetary frame having a tapered detent socket located to hold the planetary frame in meshing position, with the planetary gear meshing the driven gear, a predetermined resistance to rotation of the driven gear causing the detent to ride out of its tapered socket to permit the planetary frame to rotate and move the planetary gear out of the meshing position.

16. In a planetary power transmission device, a support, a driven shaft having a driven gear, a drive shaft, a housing carried by said support and having bearing surfaces concentric with said drive shaft, a planetary frame mounted about said drive shaft on said bearing surfaces of said housing, a drive gear rotated by the drive shaft, a planetary gear rotatably carried by said planetary frame, and meshing with said driven gear when the planetary frame is in meshing position, the spacing of the gear axes being such that the axes of the planetary gear, drive gear, and driven gear may be in the same plane when the driven gear is actuated, and the planetary gear may pass through the driven gear meshing position as the planetary frame rotates, rotation of the planetary frame moving the planetary gear out of meshing position, and continued rotation moving it again into meshing position, and a gear meshing with the drive gear and mounted to rotate said planetary gear, rotation of the drive shaft tending to rotate the planetary frame and to rotate the planetary gear, said housing carrying a spring pressed detent, and said planetary frame having a tapered detent socket located to hold the planetary frame in meshing position, with the planetary gear meshing the driven gear, a predetermined resistance to rotation of the driven gear causing the detent to ride out of its tapered socket to permit the planetary frame to rotate and move the planetary gear out of the meshing position, the rotation of the planetary frame in the same direction bringing the planetary gear repeatedly into said meshing position, where the planetary frame is held by said detent.

17. In a planetary power transmission device, a support, a driven shaft having a driven gear, a drive shaft, a housing carried by said support and having bearing surfaces concentric with said drive shaft, a planetary frame mounted about said drive shaft on said bearing surfaces of said housing, a drive gear rotated by the drive shaft, a planetary gear rotatably carried by said planetary frame, and meshing with said driven gear when the planetary frame is in meshing position, the spacing of the gear axes being such that the axes of the planetary gear, drive gear, and driven gear may be in the same plane when the driven gear is actuated, and the planetary gear may pass through the driven gear meshing position as the planetary frame rotates, rotation of the planetary frame moving the planetary gear out of meshing position, and continued rotation moving it again into meshing position, and a gear meshing with the drive gear and mounted to rotate said planetary gear, rotation of the drive shaft tending to rotate the planetary frame and to rotate the planetary gear, and spring means carried by said planetary frame and tensioned by frictional engagement with a part on said housing by rotation of said frame relative to said support, to urge the planetary frame out of meshing position whenever power is not applied to the drive shaft.

RAYMOND C. STRAWN.

REFERENCES CITED

The following references are of record in the file of this patent:

UNITED STATES PATENTS

| Number | Name | Date |
| --- | --- | --- |
| 1,472,872 | Kindl | Nov. 6, 1923 |
| 1,521,187 | Jencick | Dec. 30, 1924 |
| 1,533,072 | Brockway | Apr. 7, 1925 |
| 1,620,855 | Ahlm | Mar. 15, 1927 |
| 1,622,377 | Gilchrist | Mar. 29, 1927 |